US012690024B2

(12) United States Patent
Matsumura et al.

(10) Patent No.: US 12,690,024 B2
(45) Date of Patent: Jul. 21, 2026

(54) TERMINAL AND RADIO COMMUNICATION SYSTEM FOR FLEXIBLE MULTICAST AND BROADCAST SCHEDULING

(71) Applicant: NTT DOCOMO, INC., Tokyo (JP)

(72) Inventors: Yuki Matsumura, Tokyo (JP); Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 344 days.

(21) Appl. No.: 18/282,725

(22) PCT Filed: Mar. 19, 2021

(86) PCT No.: PCT/JP2021/011511
§ 371 (c)(1),
(2) Date: Sep. 18, 2023

(87) PCT Pub. No.: WO2022/195883
PCT Pub. Date: Sep. 22, 2022

(65) Prior Publication Data
US 2024/0155599 A1      May 9, 2024

(51) Int. Cl.
*H04L 1/18* (2023.01)
*H04W 72/121* (2023.01)
*H04W 72/1273* (2023.01)
*H04W 72/232* (2023.01)
*H04W 84/04* (2009.01)

(52) U.S. Cl.
CPC ..... *H04W 72/121* (2013.01); *H04W 72/1273* (2013.01); *H04W 72/232* (2023.01); *H04W 84/042* (2013.01)

(58) Field of Classification Search
None
See application file for complete search history.

(56) References Cited

U.S. PATENT DOCUMENTS

| | | | |
|---|---|---|---|
| 2016/0249337 A1* | 8/2016 | Liang .................... | H04W 48/12 |
| 2021/0152312 A1* | 5/2021 | Xiong ................... | H04L 5/0064 |
| 2021/0250918 A1* | 8/2021 | Liu ....................... | H04L 5/0044 |
| 2022/0183032 A1* | 6/2022 | Papasakellariou .... | H04L 1/1861 |
| 2023/0117601 A1* | 4/2023 | Yoshioka .............. | H04L 5/0055 |
| 2023/0164774 A1* | 5/2023 | Fröberg Olsson .... | H04L 5/0053 |
| | | | 370/329 |
| 2023/0180244 A1* | 6/2023 | Kou ...................... | H04L 1/1854 |
| | | | 370/312 |
| 2023/0276456 A1* | 8/2023 | Lin ....................... | H04L 1/1896 |
| | | | 370/329 |

(Continued)

OTHER PUBLICATIONS

International Search Report issued in PCT/JP2021/011511 on Nov. 2, 2021 (1 page).

(Continued)

*Primary Examiner* — Sithu Ko
(74) *Attorney, Agent, or Firm* — Osha Bergman Watanabe & Burton LLP

(57) ABSTRACT

A terminal receives downlink control information for the downlink data channel. The terminal performs scheduling of the downlink data channel in data distribution for multiple terminals based on specific downlink control information separate from the downlink control information.

4 Claims, 12 Drawing Sheets

(56)  References Cited

U.S. PATENT DOCUMENTS

2024/0015729 A1* 1/2024 Bhamri ............. H04W 72/1263
2024/0057114 A1* 2/2024 Lei ...................... H04W 72/121

OTHER PUBLICATIONS

Written Opinion of the International Searching Authority issued in PCT/JP2021/011511 on Nov. 2, 2021 (3 pages).
Ericsson; "Mechanisms to support MBS group scheduling RRC_CONNECTED UEs"; 3GPP TSG-RAN WG1 Meeting #104-e, R1-2101726; eMeeting; Jan. 25-Feb. 5, 2021 (16 pages).
MediaTek Inc; "Discussion on NR MBS group scheduling for RRC_CONNECTED UEs"; 3GPP TSG RAN WG1 #104-e, R1-2100613; e-Meeting; Jan. 25-Feb. 5, 2021 (7 pages).
Huawei, HiSilicon; "Resource configuration and group scheduling for RRC_CONNECTED UEs"; 3GPP TSG RAN WG1 Meeting #104-e, R1-2100189; E-meeting; Jan. 25-Feb. 5, 2021 (10 pages).
ZTE; "Discussion on mechanisms to Support Group Scheduling for RRC_CONNECTED UEs"; 3GPP TSG RAN WG1 #104-e, R1-2100106; e-Meeting; Jan. 25-Feb. 5, 2021 (15 pages).
Huawei; "New Work Item on NR support of Multicast and Broadcast Services"; 3GPP TSG RAN Meeting #86, RP-193248; Sitges, Spain; Dec. 9-12, 2019 (5 pages).

* cited by examiner

FIG. 3
PTM transmission scheme 1
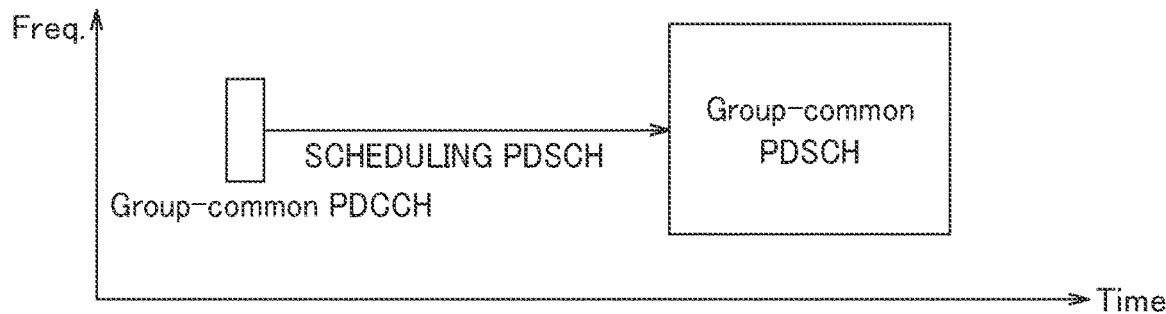
PTM transmission scheme 2
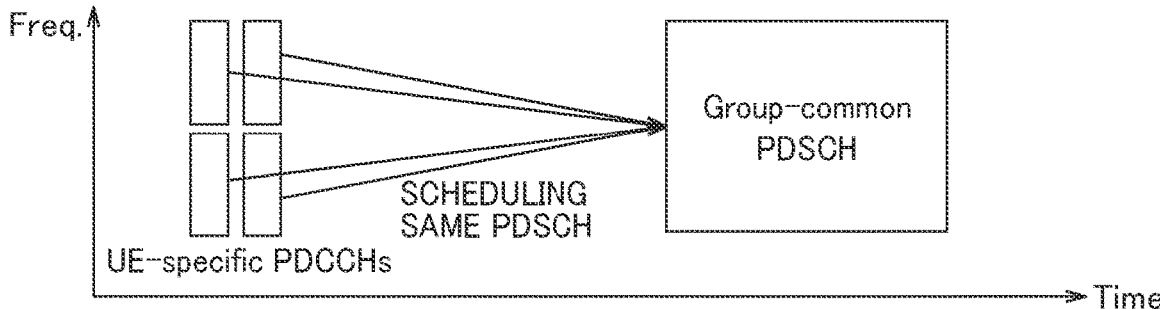

FIG. 9
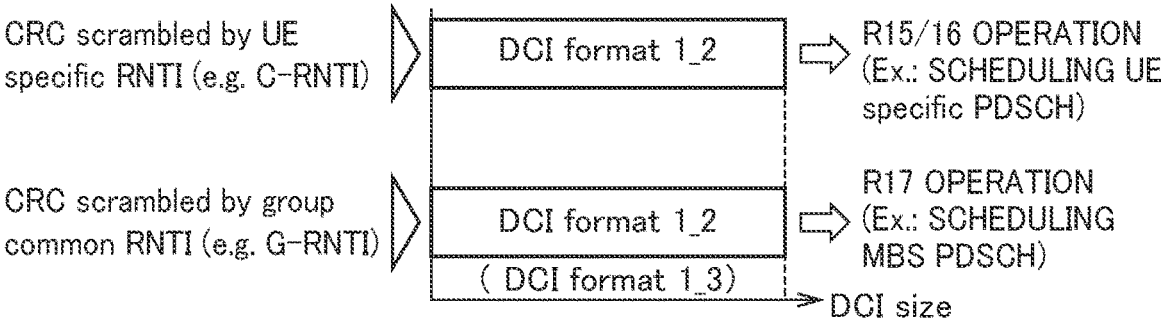
FIG. 10
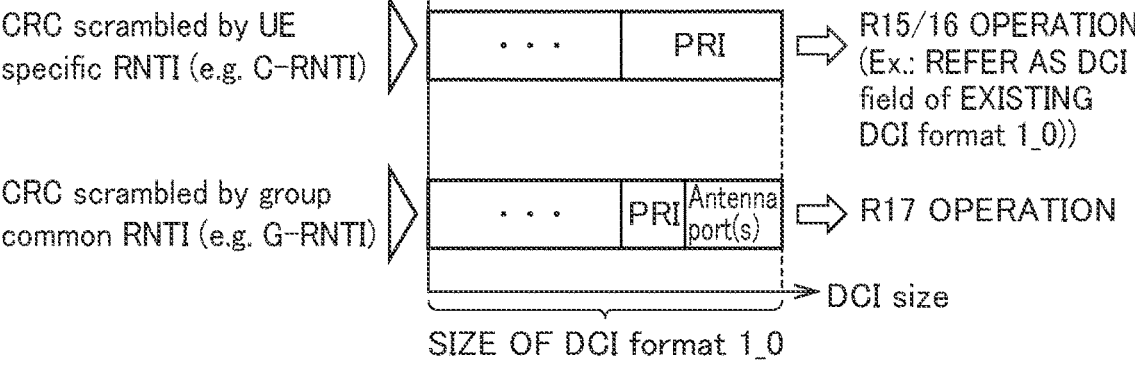
FIG. 11
| Antenna port(s) field bit size (x) | TPC command for scheduled PUCCH | PUCCH resource indicator |
|---|---|---|
| x=1 | 2 bit | 3 bit |
| x=2~3 | 2-(x-1) bit | 3 bit |
| x=4~6 | 0 bit | 3-(x-3) bit |

FIG. 12

| PRI | PUCCH resource |
|-----|----------------|
| 000 | PUCCH resource#1-0 |
| 001 | PUCCH resource#1-1 |
| : | : |
| 111 | PUCCH resource#1-7 |

| PRI | PUCCH resource |
|-----|----------------|
| 000 | PUCCH resource#2-0 |
| 001 | PUCCH resource#2-1 |
| : | : |
| 111 | PUCCH resource#2-7 |

| PRI | PUCCH resource |
|-----|----------------|
| 000 | PUCCH resource#3-0 |
| 001 | PUCCH resource#3-1 |
| : | : |
| 111 | PUCCH resource#3-7 |

PRI INDICATION

FIG. 13

| PRI | PUCCH resource | |
|---|---|---|
| 000 | PUCCH resource#0 | — INCASE OF 0-bit PRI field |
| 001 | PUCCH resource#1 | — INCASE OF 1-bit PRI field |
| 000 | PUCCH resource#2 | — INCASE OF 2-bit PRI field |
| 111 | PUCCH resource#3 | |
| 100 | PUCCH resource#4 | |
| 101 | PUCCH resource#5 | — INCASE OF 3-bit PRI field |
| 100 | PUCCH resource#6 | |
| 111 | PUCCH resource#7 | |

FIG. 14

| DCI field | PDSCH-to-HARQ_feedback timing indicator | |
|---|---|---|
| 000 | timing#0 | — INCASE OF 0-bit field |
| 001 | timing#1 | — INCASE OF 1-bit field |
| 000 | timing#2 | — INCASE OF 2-bit field |
| 111 | timing#3 | |
| 100 | timing#4 | |
| 101 | timing#5 | — INCASE OF 3-bit field |
| 100 | timing#6 | |
| 111 | timing#7 | |

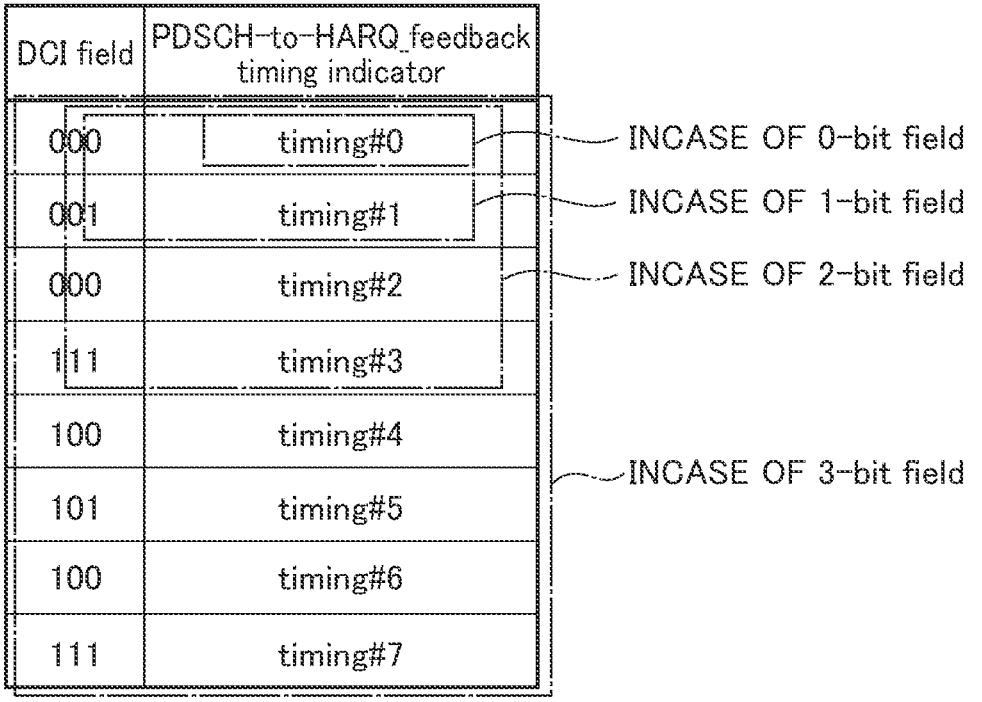

FIG. 15

Ex.: 1-bit Antenna port(s) field

| Value | DMRS port(s) |
|-------|--------------|
| 0 | 0 |
| 1 | 0, 1 |

Ex.: 2-bit Antenna port(s) field

| Value | DMRS port(s) |
|-------|--------------|
| 0 | 0 |
| 1 | 1 |
| 2 | 0, 1 |
| 3 | 0-3 |

FIG. 16

DCI format 1_0 with CRC
scrambled by other than G-RNTI ▷ Antenna port(s) field DOES NOT EXIST DCI format 1_0 with CRC
scrambled by G-RNTI ▷

Ex.: 1-bit Antenna port(s) field

| Value | DMRS port(s) |
|-------|--------------|
| 0 | 0 |
| 1 | 0, 1 |

DCI format 1_1/1_2 ▷

Table 7.3.1.2.2-1: Antenna port(s) (1000 + DMRS port),
dmrs-Type=1, maxLength=1

| One Codeword:Codeword 0 enabled, Codeword 1 disabled | | |
|-------|--------------|--------------|
| Value | Number of DMRS CDM group(s) without data | DMRS port(s) |
| 0 | 1 | 0 |
| 1 | 1 | 1 |
| 2 | 1 | 0,1 |
| 3 | 2 | 0 |
| 4 | 2 | 1 |
| 5 | 2 | 2 |
| 6 | 2 | 3 |
| 7 | 2 | 0,1 |
| 8 | 2 | 2,3 |
| 9 | 2 | 0-2 |
| 10 | 2 | 0-3 |
| 11 | 2 | 0,2 |
| 12~15 | Reserved | Reserved |

TERMINAL AND RADIO COMMUNICATION SYSTEM FOR FLEXIBLE MULTICAST AND BROADCAST SCHEDULING

TECHNICAL FIELD

The present disclosure relates to a terminal and a radio communication system supporting a multicast/broadcast service.

BACKGROUND ART

3rd Generation Partnership Project (3GPP) specifies 5th generation mobile communication system (5G, also called New Radio (NR) or Next Generation (NG), further, a succeeding system called Beyond 5G, 5G Evolution or 6G is being specified.

Release 17 of the 3GPP covers simultaneous data transmission (also called broadcasting) services (tentatively called Multicast and Broadcast Services (MBS)) to specified or unspecified multiple terminals (User Equipment, UE) in NR (Non-Patent Literature 1).

In MBS, for example, the scheduling of UE groups to be serviced and the improvement of reliability (For example, feedback to a HARQ (Hybrid Automatic repeat request) radio base station (gNB)) are being studied.

CITATION LIST

Non-Patent Literature

[Non-Patent Literature 1]
"New Work Item on NR support of Multicast and Broadcast Services," RP-193248, 3GPP TSG RAN Meeting #86, 3GPP, December 2019

SUMMARY OF INVENTION

Among the existing Downlink Control Information (DCI) formats, MBS is expected to support scheduling using DCI format 1_0 (DCI 1_0 shall be omitted as appropriate) for at least the downlink data channel (PDSCH: Physical Downlink Shared Channel).

However, compared with other DCI formats, DCI 1_0 has the advantage of small size, but has the problem of limited function such as the inability to specify an antenna port.

Therefore, the following disclosure is made in view of this situation, and is intended to provide a terminal and a radio communication system capable of realizing flexible and efficient scheduling using downlink control information in a simultaneous data transmission service to a plurality of specified or unspecified terminals.

An aspect of the present disclosure is a terminal (UE200) including a reception unit (control signal and reference signal processing unit 240) that receives downlink control information for a downlink data channel and a control unit that executes scheduling of a downlink data channel in data distribution for multiple terminals based on specific downlink control information separate from the downlink control information.

An aspect of the present disclosure is a terminal (UE200) including a reception unit (control signal and reference signal processing unit 240) that receives downlink control information for a downlink data channel and a control unit that executes scheduling of a downlink data channel in data distribution for multiple terminals based on specific downlink control information of the same size as the downlink control information.

An aspect of the present disclosure is a terminal (UE200) including a reception unit (control signal and reference signal processing unit 240) that receives downlink control information for a downlink data channel and a control unit (control unit 270) that executes scheduling of a downlink data channel in data distribution for multiple terminals based on specific downlink control information in which a part of fields included in the downlink control information have been changed.

An aspect of the present disclosure is a radio communication system including a radio base station and a terminal. The radio base station includes a transmission unit that transmits downlink control information for a downlink data channel, and the terminal includes a reception unit that receives the downlink control information and a control unit that executes scheduling of a downlink data channel in data distribution for multiple terminals based on specific downlink control information separate from the downlink control information.

An aspect of the present disclosure is a radio communication system including a radio base station and a terminal. The radio base station includes a transmission unit that transmits downlink control information for a downlink data channel, and the terminal includes a reception unit that receives the downlink control information and a control unit that executing scheduling of a downlink data channel in data distribution for multiple terminals based on specific downlink control information of the same size as the downlink control information.

An aspect of the present disclosure is a radio communication system including a radio base station and a terminal. The radio base station includes a transmission unit that transmits downlink control information for a downlink data channel, and the terminal includes a reception unit that receives the downlink control information and a control unit that executes scheduling of a downlink data channel in data distribution for multiple terminals based on specific downlink control information in which a part fields included in the downlink control information have been changed.

An aspect of the present disclosure is a terminal (UE200) including a reception unit (control signal and reference signal processing unit 240) that receives a minimum size downlink control information for a downlink data channel and a control unit (control unit 270) that executes scheduling of the downlink data channel based on antenna port information included in the downlink control information.

An aspect of the present disclosure is radio communication system including a radio base station and a terminal. The radio base station includes a transmission unit that transmits downlink control information of a minimum size for a downlink data channel, and the terminal includes a reception unit that receives the downlink control information and a control unit that executes scheduling of the downlink data channel based on antenna port information included in the downlink control information.

An aspect of the present disclosure is radio communication method including the steps of receiving a minimum size downlink control information for a downlink data channel and executing scheduling of the downlink data channel based on antenna port information included in the downlink control information.

BRIEF DESCRIPTION OF DRAWINGS

FIG. 3 is a diagram showing a configuration example of the PTM transmission system 1 and the PTM transmission system 2.

FIG. 4 is a functional block diagram of the gNB100 and the UE200.

FIG. 9 is a diagram showing an example of a correspondence relationship between RNTI and DCI format according to operation example 1-2.

FIG. 10 is a diagram showing an example of a correspondence relationship between RNTI and DCI format according to operation example 2.

FIG. 11 is a diagram showing an example of configuring the Antenna port(s) field according to the operation example 2.

FIG. 12 shows a configuration example of the PUCCH resource indicator.

FIG. 13 is a diagram showing an example of a correspondence relationship between each PUCCH resource and the PRI (variable field) according to the operation example 2.

FIG. 14 is a diagram showing an example of configuring a variable size DCI field according to the operation example 2.

FIG. 15 is a diagram showing an example of configuring the Antenna port(s) field according to the operation example 3.

FIG. 16 is a diagram showing an example of correspondence between the DCI format and the Antenna port(s) field according to the operation example 3.

MODES FOR CARRYING OUT THE INVENTION

Figure 1:
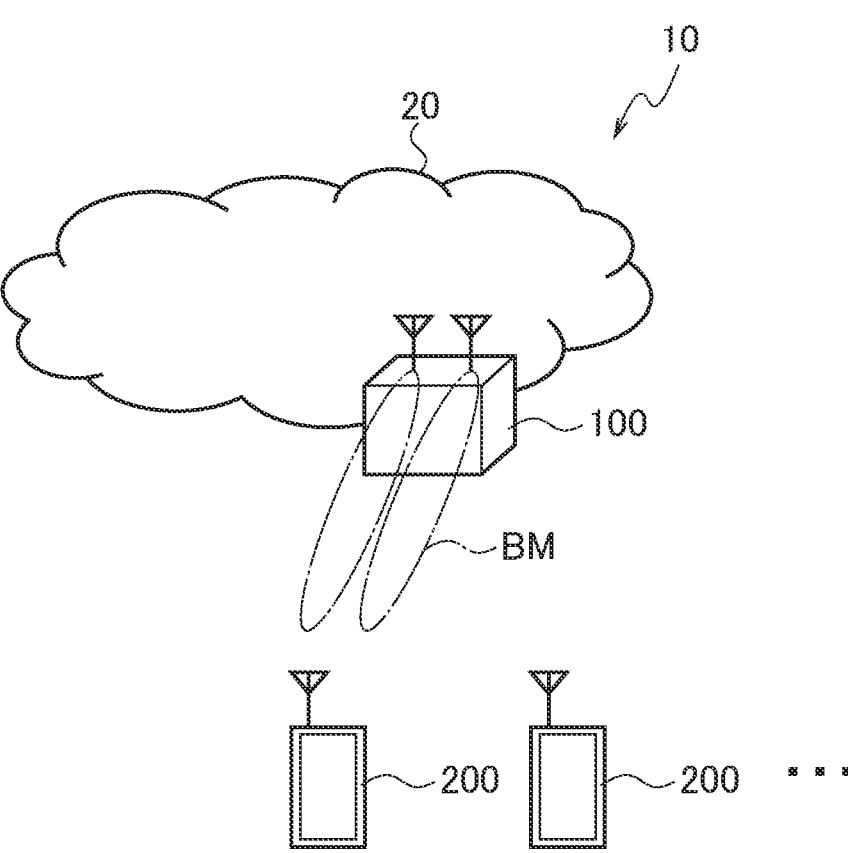
FIG. 1 is an overall schematic configuration diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of the Radio Communication System

(1.1) Example of a System Configuration

FIG. 1 is an overall schematic configuration diagram of a radio communication system 10 according to the present embodiment. The radio communication system 10 is a radio communication system according to 5G New Radio (NR) and includes the Next Generation-Radio Access Network 20 (hereinafter referred to as the NG-RAN20 and a plurality of terminals 200 (User Equipment 200, UE200).

The radio communication system 10 may be a radio communication system according to a system called Beyond 5G, 5G Evolution or 6G.

The NG-RAN20 includes a radio base station 100 (gNB100). The specific configuration of radio communication system 10 including the number of gNBs and UEs is not limited to the example shown in FIG. 1.

The NG-RAN20 actually includes a plurality of NG-RAN Nodes, specifically gNBs (or ng-eNBs), connected to a core network (5GC, not shown) according to 5G. Note that the NG-RAN20 and 5 GCs may be simply described as "networks".

The gNB100 is a radio base station according to the NR, and performs radio communication according to the UE200 and the NR. The gNB100 and the UE200 can support Massive MIMO, which generates a more directional beam BM by controlling radio signals transmitted from a plurality of antenna elements, carrier aggregation (CA), which uses a plurality of component carriers (CCs) bundled together, and dual connectivity (DC), which simultaneously communicates between the UE and each of a plurality of NG-RAN nodes.

The radio communication system 10 supports FR1 and FR2. The frequency band of each FR (Frequency Range) is as follows.

FR1:410 MHz-7.125 GHz

FR2:24.25 GHz-52.6 GHz

FR1 uses sub-carrier spacing (SCS) of 15, 30 or 60 kHz and may use a bandwidth (BW) of 5~100 MHz. FR2 is higher frequency than FR1 and may use SCS of 60 or 120 kHz (may include 240 kHz) and may use a bandwidth (BW) of 50-400 MHz.

In addition, the radio communication system 10 may support higher frequency bands than those of FR2. Specifically, the radio communication system 10 may support frequency bands greater than 52.6 GHz and up to 114.25 GHz. radio communication system 10 may also support frequency bands between FR1 and FR2.

Cyclic Prefix-Orthogonal Frequency Division Multiplexing (CP-OFDM)/Discrete Fourier Transform-Spread (DFT-S-OFDM) with greater Sub-Carrier Spacing (SCS) may also be applied. Furthermore, DFT-S-OFDM may be applied not only to the uplink (UL) but also to the downlink (DL).

Figure 2:
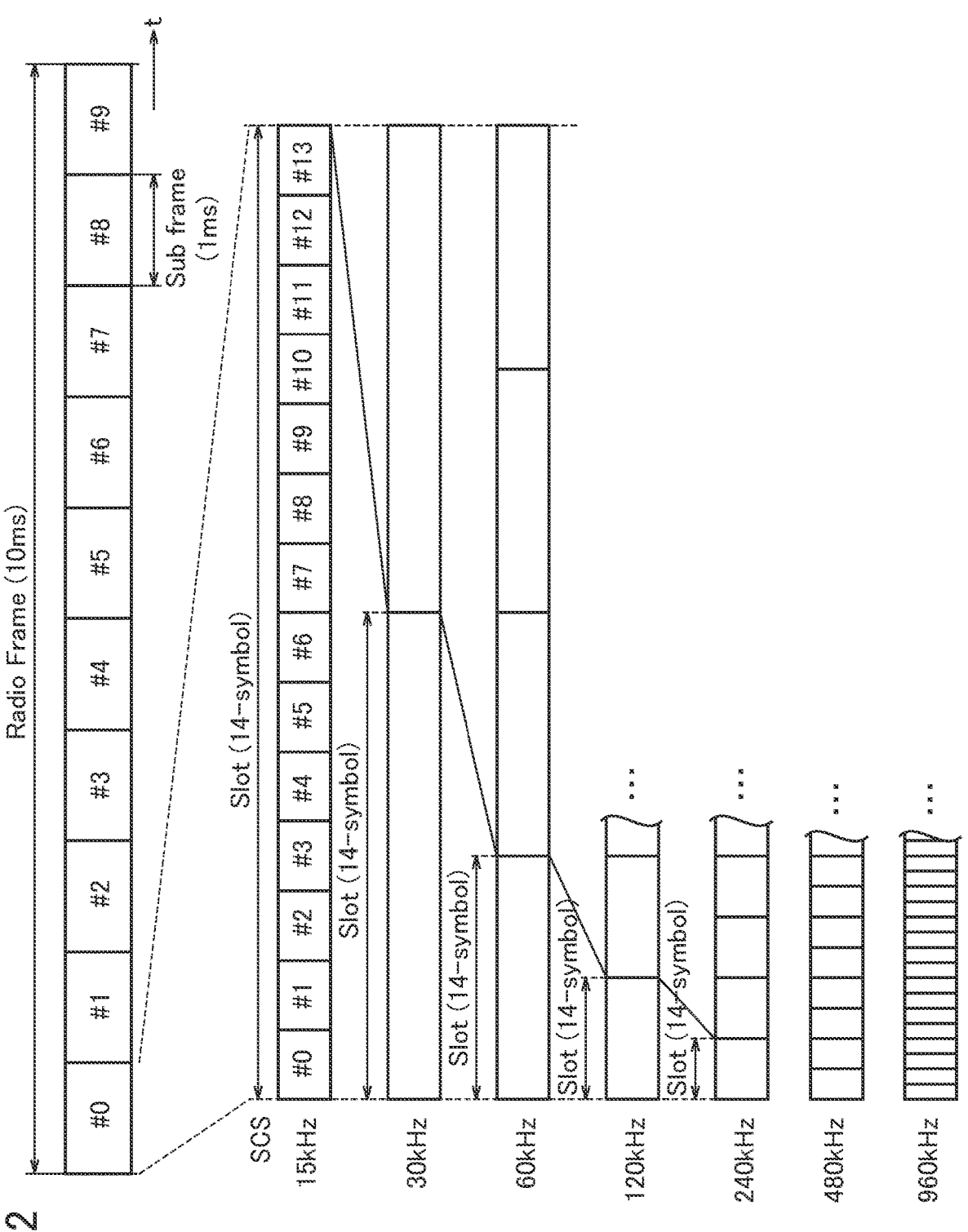
FIG. 2 is a diagram showing a configuration example of a radio frame, a sub-frame and a slot used in radio communication system 10.

FIG. 2 shows a configuration example of a radio frame, subframe and slot used in radio communication system 10.

As shown in FIG. 2, one slot is composed of 14 symbols, and the larger (wider) the SCS, the shorter the symbol period (and slot period). Note that the number of symbols constituting one slot may not necessarily be 14 symbols (For example, 28, 56 symbols). The number of slots per subframe may vary depending on the SCS. In addition, the SCS may be wider than 240 kHz (For example, as shown in FIG. 2, 480 kHz, 960 kHz).

Note that the time direction (t) shown in FIG. 2 may be referred to as a time domain, symbol period, symbol time, etc. The frequency direction may be referred to as a frequency domain, resource block, resource block group, subcarrier, BWP (Bandwidth part), subchannel, common frequency resource, etc.

(1.2) Provision of MBS

In the radio communication system 10, multicast and broadcast services (MBS) may be provided.

For example, in a stadium or hall, a large number of UE200s may be located in a certain geographic area and a large number of UE200 s may simultaneously receive the same data. In such a case, the use of MBS rather than unicast is effective.

Unicast may be interpreted as communication that takes place one-to-one with the network by specifying one specific UE200 (identification information specific to the UE200 may be specified).

Multicasting may be interpreted as communication that takes place one-to-many (specific many) with the network by specifying multiple specific UEs 200 (identification information for multicasting may be specified). It should be noted that as a result, the number of UEs 200 that receive data for receiving multicasting may be 1.

Broadcast may be interpreted as communication between the network and an unspecified number of UEs 200. The data to be multicasted/broadcast may have identical copied content, but some content such as headers may be different. Also, while the data to be multicasted/broadcast may be transmitted (distributed) at the same time, it does not necessarily require strict concurrency and may include propagation delays and/or processing delays within RAN nodes, etc.

Note that the target UE200 may be in the radio resource control layer (RRC) state of either idle (RRC idle), connected (RRC connected) or other state (For example, an inactive state). The inactive state may be interpreted as a state in which some configurations of the RRC are maintained.

MBS envisions three methods for scheduling the multicast/broadcast Physical Downlink Shared Channel (PDSCH), specifically scheduling MBS packets (which may be read as data). RRC connected UE may be read as RRC idle UE and RRC inactive UE.

PTM transmission method 1(PTM-1):—Schedule group-common PDSCH using group-common PDCCH (Physical Downlink Control Channel) for MBS group of RRC connected UE.

CRC(Cyclic Redundancy Checksum) and PDSCH of PDCCH are scrambled by group-common RNTI (Radio Network Temporary Identifier, may be called G-RNTI).

PTM Transmission Method 2(PTM-2):—For the MBS group of the RRC connected UE, the group-common PDSCH is scheduled using the terminal-specific (UE-specific) PDCCH.

The CRC of the PDCCH is scrambled by the UE-specific RNTI.

The PDSCH is scrambled by the group-common RNTI.

PTP transmission method:—UE-specific PDSCH is scheduled for the RRC connected UE using UE-specific PDCCH.

CRC and PDSCH of PDCCH are scrambled by UE-specific RNTI. This may mean that MBS packets are transmitted by Unicast.

FIG. 3 shows a configuration example of PTM transmission method 1 and PTM transmission method 2. The UE-specific PDCCH/PDSCH may be identified by the target UE, but may not be identified by other UEs in the same MBS group. The group-common PDCCH/PDSCH is transmitted at the same time/frequency resource and can be identified by all UEs in the same MBS group. The names of the PTM transmission methods 1 and 2 are tentative and may be called by different names as long as the operations described above are performed.

In point-to-point (PTP) distribution, the RAN node may distribute individual copies of the MBS data packets by radio to individual UEs. In point-to-multipoint (PTM) distribution, the RAN node may distribute a single copy of the MBS data packets to a set of UEs by radio.

In order to improve the reliability of MBS, the following two feedback methods are envisaged for HARQ (Hybrid Automatic repeat request) feedback, specifically HARQ feedback for multicast/broadcast PDSCH.

Option 1: Feedback both ACK and NACK (ACK/NACK feedback)—The UE that successfully receives and decrypts the PDSCH sends an ACK—The UE that fails to receive and decrypt the PDSCH sends a NACK—PUCCH (Physical Uplink Control Channel) resource configurations: PUCCH-Config can be configured for multicasting PUCCH resources: Shared/orthogonal between UEs depends on network configurations HARQ-ACK CB (codebook): supports type-1 and type-2 (CB decision algorithm (specified in 3GPP TS 38.213)

Multiplexing: Unicast or multicast can be applied

Option 2: NACK-only feedback

A UE that successfully receives and decrypts a PDSCH does not send an ACK (does not send a response)

A UE that fails to receive and decrypt a PDSCH sends a NACK

For a given UE, PUCCH resource configurations can be set separately by unicasting or group casting (multicast)

Note that ACK may be referred to as positive acknowledgement and NACK as negative acknowledgement. HARQ may be called an automatic retransmitting request.

Enabling/Disabling Option 1 or Option 2 may be either:

RRC and Downlink Control Information (DCI)

RRC only

In addition, the following is expected for semi-persistent scheduling (SPS) for multicast/broadcast PDSCH:

Adopts SPS group-common PDSCH

Multiple SPS group-common PDSCH can be configured for UE capability

HARQ feedback for SPS group-common PDSCH is possible

Activation/deactivation with at least group-common PDCCH is possible

Note that deactivation may be replaced with other synonymous terms such as release. For example, activation may be replaced with start, start, trigger, etc., and deactivation may be replaced with end, stop, etc.

SPS is scheduling used as a contrast to dynamic scheduling and may be referred to as semi-fixed, semi-persistent, semi-persistent, etc., and may be interpreted as Configured Scheduling (CS).

Scheduling may be interpreted as the process of allocating resources to transmit data. Dynamic scheduling may be interpreted as the mechanism by which all PDSCH are scheduled by DCI (For example, DCI 1_0, DCI 1_1, or DCI 1_2). SPS may be interpreted as the mechanism by which PDSCH transmissions are scheduled by higher layer signaling, such as RRC messages.

Also, for the physical layer, there may be a scheduling category of time domain scheduling and frequency domain scheduling.

Furthermore, multicast, group cast, broadcast, and MBS may be interchanged. Multicast PDSCH (May include group-common PDSCH and SPS group-common PDSCH), MBS PDSCH, and PDSCH scrambled by group common RNTI (which may be called G-RNTI) may be interchanged.

In addition, data and packet terms may be interchanged and may be interpreted as synonymous with terms such as signal, data unit, etc. and transmission, reception, transmission and delivery may be interchanged.

(2) Function Block Configuration of Radio Communication System

Next, a functional block configuration of the radio communication system 10 will be described. Specifically, a functional block configuration of the gNB100 and the UE200 will be described.

Figure 4:
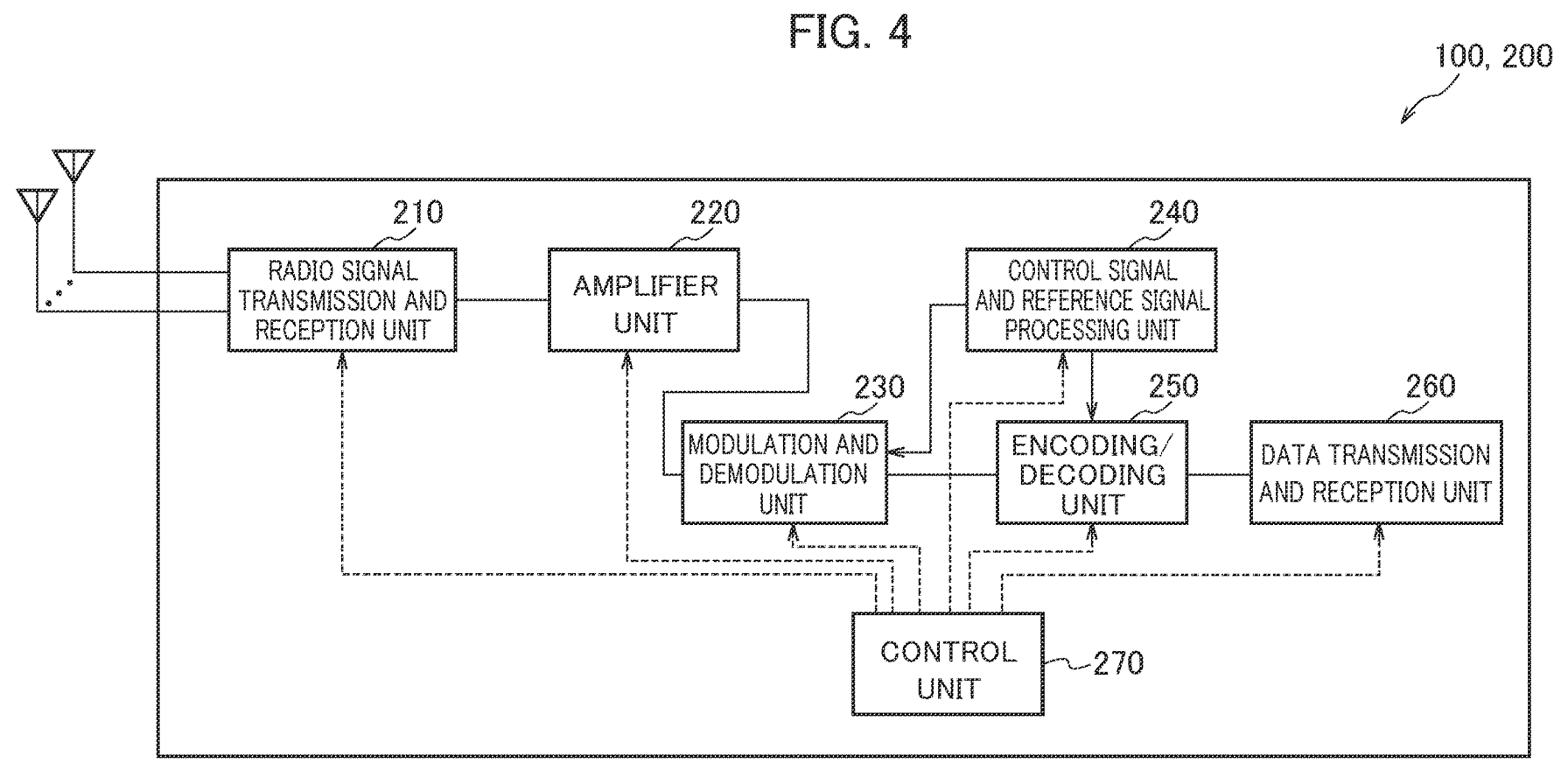

FIG. 4 is a functional block diagram of the gNB100 and the UE200. The UE200 will be described below. As shown in FIG. 4, the UE200 includes a radio signal transmission and reception unit 210, an amplifier unit 220, a modulation and demodulation unit 230, a control signal and reference signal processing unit 240, an encoding/decoding unit 250, a data transmission and reception unit 260, and a control unit 270.

Note that in FIG. 4, only the main functional blocks related to the description of the embodiment are shown, and the UE200 includes other functional blocks (For example, the power supply unit). FIG. 4 also shows the functional block configuration of the UE200(gNB100), and refer to FIG. 17 for the hardware configuration.

The radio signal transmission and reception unit 210 transmits and receives radio signals in accordance with the NR. The radio signal transmission and reception unit 210 corresponds to a Massive MIMO, a CA using a plurality of CCs bundled together, and a DC that simultaneously communicates between a UE and each of two NG-RAN Nodes.

The radio signal transmission and reception unit 210 also supports MBS and can receive a downlink channel common to a group of terminals in data distribution for a plurality of UE200s. In this embodiment, the radio signal transmission and reception unit 210 may constitute a reception unit.

The radio signal transmission and reception unit 210 may receive a downstream data channel (PDSCH) common to the terminal group, specifically, a group-common PDSCH (which may include an SPS group-common PDSCH). The radio signal transmission and reception unit 210 may also receive a downstream control channel common to the terminal group, specifically, a group-common PDCCH.

The amplifier unit 220 is configured by a PA (Power Amplifier)/LNA (Low Noise Amplifier) or the like. The amplifier unit 220 amplifies the signal output from the modulation and demodulation unit 230 to a predetermined power level. The amplifier unit 220 amplifies the RF signal output from radio signal transmission and reception unit 210.

The modulation and demodulation unit 230 performs data modulation/demodulation, transmission power setting, resource block allocation, etc., for each predetermined communication destination (gNB100, etc.). In the modulation and demodulation unit 230, Cyclic Prefix-Orthogonal Frequency Division Multiplexing (CP-OFDM)/Discrete Fourier Transform-Spread (DFT-S-OFDM) may be applied. DFT-S-OFDM may be used not only for the uplink (UL) but also for the downlink (DL).

The control signal and reference signal processing unit 240 performs processing related to various control signals transmitted and received by the UE200 and various reference signals transmitted and received by the UE200.

Specifically, the control signal and reference signal processing unit 240 receives various control signals transmitted from the gNB100 via a predetermined control channel, for example, a radio resource control layer (RRC) control signal. The control signal and reference signal processing unit 240 also transmits various control signals to the gNB100 via a predetermined control channel.

The control signal and reference signal processing unit 240 performs processing using a reference signal (RS) such as a demodulation reference signal (DMRS) and a phase tracking reference signal (PTRS).

The DMRS is a known reference signal (pilot signal) between a base station and a terminal of each terminal for estimating a fading channel used for data demodulation. The PTRS is a reference signal of each terminal for estimating phase noise, which is a problem in a high frequency band.

In addition to the DMRS and the PTRS, the reference signal may include a Channel State Information-Reference Signal (CSI-RS), a Sounding Reference Signal (SRS), and a Positioning Reference Signal (PRS) for position information.

The channel may include a control channel and a data channel. The control channel may include PDCCH, PUCCH (Physical Uplink Control Channel), RACH (Random Access Channel, Downlink Control Information (DCI) with Random Access Radio Network Temporary Identifier (RA-RNTI)), and Physical Broadcast Channel (PBCH).

The data channels include PDSCH and PUSCH (Physical Uplink Shared Channel). Data may mean data transmitted over a data channel.

In this embodiment, control signal and reference signal processing unit 240 may comprise a reception unit that receives downlink control information (DCI). Specifically, the control signal and reference signal processing unit 240 can receive DCI for the downlink data channel. Downlink data channel may mean PDSCH, and (scheduling) DCI for PDSCH may include, for example, DCI format 1_0 (DCI 1_0). DCI for PDSCH may include DCI 1_1 and DCI 1_2. In addition, a new DCI format, DCI 1_3 (tentative name), may be included. The DCI may also include DCI format 2_x (For convenience, DCI 2_x), which notifies multiple UEs of the DCI, such as slot formats.

DCI 1_0, 1_1, 1_2 may all be DCI for scheduling PDSCH in one cell, but DCI 1_0 may be defined as the smallest size DCI in this. That is, DCI 1_0 may be defined as the smallest size DCI (downlink control information) for PDSCH (downlink data channel). In addition, DCI 1_0 may be a DCI format for scheduling PDSCH when performing system information or random access. DCI 1_0 may be a DCI format in which multiple UEs in a BWP/cell assume the same DCI size.

The encoding/decoding unit 250 performs data partitioning/concatenation and channel coding/decoding for each predetermined communication destination (gNB100 or other gNB).

Specifically, the encoding/decoding unit 250 divides the data output from the data transmission and reception unit 260 into predetermined sizes and performs channel coding for the divided data. The encoding/decoding unit 250 decodes the data output from the modulation and demodulation unit 230 and concatenates the decoded data.

The data transmission and reception unit 260 transmits and receives protocol data units (PDU) and service data units (SDU). Specifically, the data transmission and reception unit 260 performs assembly/disassembly of PDUs/SDUs in a plurality of layers (Media access control layer (MAC), radio link control layer (RLC), packet data convergence protocol layer (PDCP), etc.). The data transmission and reception unit 260 also performs error correction and retransmission control of data based on a hybrid automatic repeat request (ARQ).

The control unit 270 controls each function block constituting the UE200. In particular, in the present embodiment, the control unit 270 performs control on the scheduling of the downlink channel with respect to the MBS and the HARQ feedback of the channel.

The control unit 270 performs control corresponding to the scheduling of the downlink data channel common to the terminal group (group common) in the data distribution for the MBS, that is, the plurality of UE200s. Specifically, the control unit 270 can perform control corresponding to the scheduling of the group-common PDCCH and the group-common PDSCH.

The control unit 270 can also execute scheduling of a downlink channel, specifically, a downlink data channel such as a PDSCH (May include group-common PDSCH and SPS group-common PDSCH, hereinafter the same), based on the DCI received by control signal and reference signal processing unit 240.

In this embodiment, the control unit 270 may execute scheduling of an MBS, that is, a PDSCH in data distribution for multiple terminals, based on a specific DCI that is separate from the DCI (For example, DCI 1_0) for the PDSCH. Here, the specific DCI may be referred to as DCI 1_3, which is a new DCI format as described above. DCI 1_3 may have the same size as DCI 1_0 or a different size. DCI 1_3 may have the same size as DCI 1_0 and a minimum size DCI. Size may mean bit length (number of bits).

The control unit 270 may perform scheduling of PDSCH in the MBS based on a specific DCI of the same size as the DCI for PDSCH (For example, DCI 1_1, 1-2). The specific DCI of the same size may have the same name as an existing DCI, such as DCI 1_2, or the specific DCI may be called DCI 1_3.

The particular DCI may be scrambled (DCI format with CRC scrambled by G-RNTI) with the CRC. The G-RNTI is the RNTI associated with the terminal group and may be called by another name.

The control unit 270 may perform scheduling of the PDSCH in the MBS based on a specific DCI in which some fields included in the DCI (For example, DCI 1_0) for the PDSCH have been changed. For example, some of the fields (3 bits) of the PUCCH resource indicator (PRI) included in the DCI 1_0 may be changed to other information.

The information to be changed may be information specified in the DCI 1_2 or the like and not specified in the DCI 1_0. For example, antenna port information may be used.

The control unit 270 may also execute scheduling of the PDSCH based on the antenna port information included in the DCI. The antenna port information may be represented by 1 bit or 2 bits. The antenna port (number) may be read as the DMRS port (number).

The control unit 270 may determine whether the DCI contains antenna port information based on at least one of the higher layer (For example, RRC) control information or identification information used to scramble the DCI, specifically RNTI. That is, whether the DCI contains the field of the antenna port may be determined based on the control information or RNTI.

In this case, the DCI (For example, DCI 1_0) may be limited for MBS, that is, for scheduling multicast PDSCH. In this case, the PDSCH may be interpreted as a multicast PDSCH (PDSCH) for MBS and may be a scrambled PDSCH associated with an RNTI assigned to multiple UEs, such as a G-RNTI.

In addition, the gNB100 can perform the above-mentioned downlink channel scheduling and HARQ control. For example, the gNB100 may include a transmission unit (control signal and reference signal processing unit 240) that transmits downlink control information for the downlink data channel.

(3) Operation of Radio Communication System

Next, an operation of radio communication system 10 will be described. Concretely, an operation for scheduling the downlink channel with respect to the MBS, and specifically, an operation for scheduling the MBS PDSCH more flexibly than the DCI 1_0 will be described.

Figure 5:
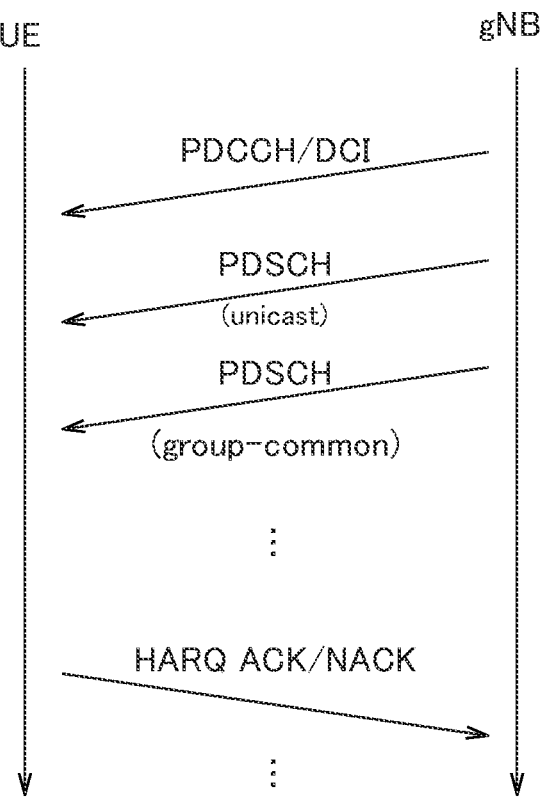
FIG. 5 is a diagram showing an example sequence of PDCCH, PDSCH and HARQ feedback in MBS.

FIG. 5 shows an example sequence of PDCCH, PDSCH and HARQ feedback in the MBS. As shown in FIG. 5, PDCCH (which may include DCI) and PDSCH may be transmitted by unicast or multicast (broadcast). The UE200 may also transmit HARQ feedback (ACK/NACK) for the channel (transport block (TB) received via).

In FIG. 5, it appears that both unicast PDSCH and multicast PDSCH are transmitted after one PDCCH/DCI, but either unicast PDSCH or multicast PDSCH may be transmitted after one PDCCH/DCI. That is, one PDCCH/DCI may schedule either unicast PDSCH or multicast PDSCH.

The PTM-1 described above may support DCI 1_0. Specifically, in the PTM-1, DCI 1_0 may be scrambled (DCI 1_0 with CRC scrambled by G-RNTI) with CRC.

G-RNTI may be used for group-common PDCCH CRC scrambling and/or PDSCH data scrambling of MBS. G-RNTI may be set by the control information of the higher layer (For example, RRC). The G-RNTI may be an RNTI related to the group-common PDCCH and/or the group-common PDSCH (which may include the SPS group-common PDSCH) (hereinafter the same).

As described above, at least DCI 1_0 may be used for the MBS PDSCH. However, if only DCI 1_0 can be used for scheduling the MBS PDSCH, it is not desirable because the function is limited.

For example, since DCI 1_0 does not contain antenna port information (Antenna port(s)), it cannot transmit PDSCH Multiple-Input Multiple-Output (MIMO) (PDSCH is a one-layer transmission).

Considering the use case of MBS, as described above, PDSCH transmission with relatively high data traffic, such as simultaneous video streaming in a stadium, is assumed. Therefore, it is not desirable to limit MBS PDSCH to one MIMO layer. It is desirable that MIMO can also be used in MBS.

In addition, the use of fields other than Antenna port(s) can be expected to improve PDSCH scheduling flexibility, PDSCH resource utilization efficiency, and frequency utilization efficiency.

For example, a field containing at least any of the following information may be used:
(i) Carrier indicator
(ii) Bandwidth part indicator
(iii) resource allocation type 0 is available
(iv) PRB (Physical Resource Block) bundling size indicator
(v) Rate matching indicator
(vi) ZP (Zero Power) CSI-RS trigger
(vii) Antenna port(s)
(viii) Transmission configuration indication
(ix) SRS request
(x) DMRS sequence initialization
(xi) Priority indicator
The information (i) through (xi) is not included in DCI 1_0, but may be included in DCI 1_2. Such fields in the DCI may also be applied to the scheduling of the MBS PDSCH. In the following, an operation example of indicating such information in the scheduling of the MBS PDSCH will be described.

(3.0) Operation Example 0

In this operation example, only DCI 1_0 may be used in the PTM-1. Such a DCI may be called a Group common DCI. Because it is scheduled by a Group common DCI, the DCI format in which MBS PDSCH can be scheduled according to a DCI that is CRC scrambled by G-RNTI may be limited to DCI 1_0. This solves the problems described below.

Since the PTM-2 is scheduled by a unicast (CRC scrambled by UE-specific RNTI) DCI, any of DCI 1_0, DCI 1_1, or DCI 1_2 may be available as a DCI format capable of scheduling the MBS PDSCH. In this case, the available DCI format may be set by an higher layer (such as RRC). This can contribute to reducing the processing load of the UE200 and solve the problems described later.

While the PTM-1 can only schedule a PDSCH with a maximum of 1 layer, the PTM-2 can schedule a PDSCH with multiple layers. The UE may be assumed to schedule PDSCH of up to one layer in PTM-1, but schedule PDSCH of multiple layers in PTM-2.

Since it is burdensome for UE200 to implement both PTM-1 and PTM-2 for scheduling MBS PDSCH, some UEs are assumed to implement only PTM-1. Therefore, in the following, in particular, an operation example when PTM-1 is applied will be further described.

(3.1) Operation Example 1

(3.1.1) Operation Example 1-1

In this operation example, DCI 1_3 (tentative name) may be newly defined. Specifically, the MBS PDSCH may be scheduled using a DCI format other than DCI 1_0 in the PTM-1 that schedules the MBS PDSCH using a DCI that is CRC scrambled by G-RNTI.

Figure 6:
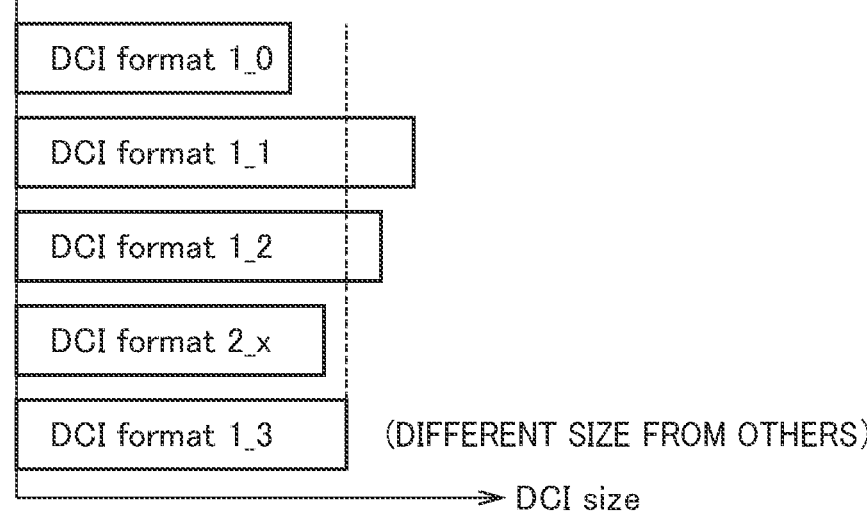
FIG. 6 is a diagram showing the size of a main DCI including DCI 1_3 (tentative name) according to operation example 1-1.

A DCI format other than DCI 1_0 may be a new DCI, for example, DCI 1_3 (tentative name) may be specified FIG. 6 shows the sizes of major DCIs including DCI 1_3 (tentative name) according to operation example 1-1. DCI 1_3 may be a DCI payload (field) size different from the existing DCI format.

DCI 1_3 may include at least any of the above (i)-(xi) information in addition to the fields used for scheduling MBS PDSCH among the fields of DCI 1_0.

Since the number of times of blind detection (BD) of DCI may increase, the UE200 may execute BD of DCI 1_3 only when BD of DCI 1_3 is set by a higher layer.

Such a new DCI format such as DCI 1_3 may be used as a schedule-only DCI format of MBS PDSCH. That is, the DCI may be detected only when MBS is set. When PTM-1 is set, UE200 may only assume that DCI 1_3 is scheduled by G-RNTI in order to reduce processing load.

When a new DCI format such as DCI 1_3 is used, gNB100 and UE200 may further operate as follows: For example, in PTM-1 scheduling MBS PDSCH using a DCI that is CRC scrambled by G-RNTI, MBS PDSCH may be scheduled using a DCI format other than DCI 1_0.

Figure 7:
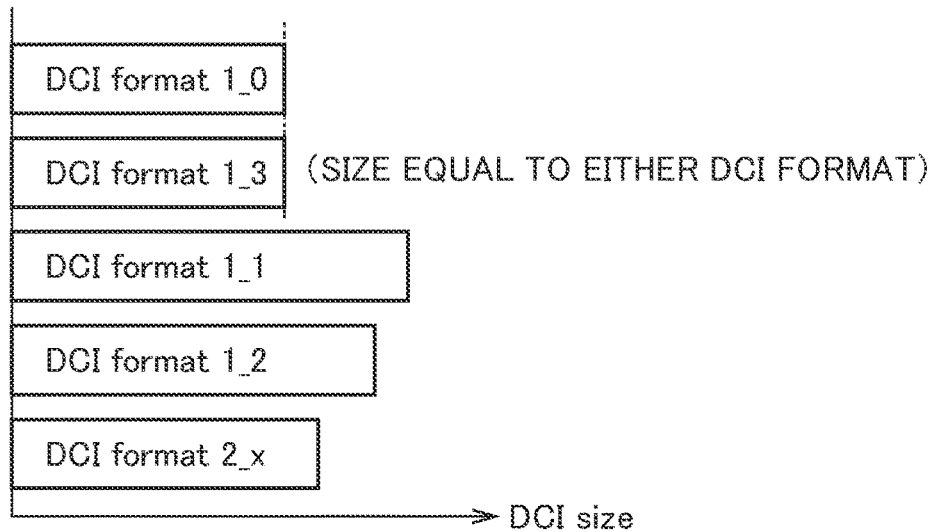
FIG. 7 is a diagram showing the size of a main DCI including DCI 1_3 (tentative name) according to the modified example of operation example 1-1.

FIG. 7 shows the size of a main DCI including DCI 1_3 (tentative name) according to the modification of operation example 1-1. As shown in FIG. 7, DCI 1_3 may be equal in size to any of the other existing DCI formats. Equal in size may be interpreted as having the same bit length (number of bits). For example, DCI 1_3 may have the same size as DCI 1_0 (the reason why DCI 1_0 and DCI 1_3 have the same size will be described later).

Figure 8:
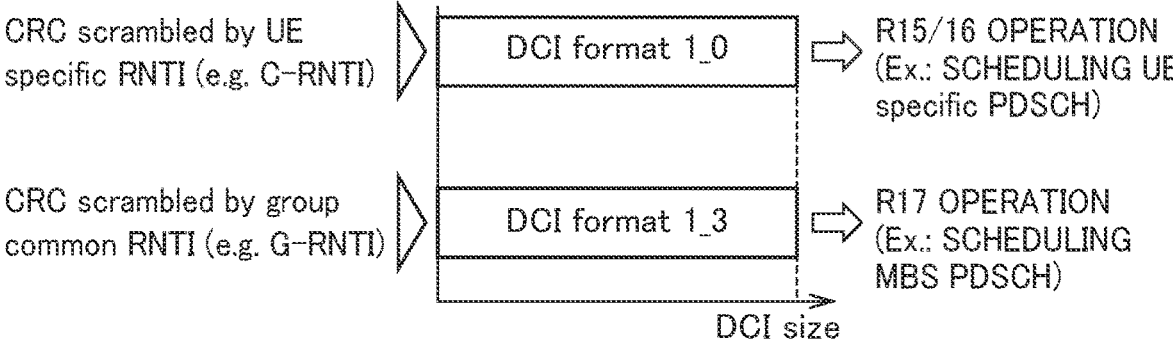
FIG. 8 is a diagram showing an example of a correspondence relationship between RNTI and DCI format according to operation example 1-1.

FIG. 8 shows an example of a correspondence relationship between RNTI and DCI format according to operation example 1-1. As shown in FIG. 8, DCI 1_0 and DCI 1_3 may be switched by CRC scrambled by RNTI.

Specifically, when scrambled by C-RNTI, DCI 10 may be used, and when scrambled by G-RNTI, DCI 1_3 may be used.

When scrambled by C-RNTI, DCI 1_0 may be used, the operation is in accordance with 3GPP Releases—15, 16 and may be applied, for example, to scheduling UE specific PDSCH. When scrambled by G-RNTI, DCI 1_3 may be used, the operation is in accordance with 3GPP Release-17 and may be applied to scheduling MBS PDSCH.

Alternatively, any field of DCI 1_0 (For example, Identifier for DCI formats –1 bit) may be used to perform the switching described above.

When the RNTIs are different, switching is sufficient based on the RNTI, but when the CRC scrambled RNTI is equal between DCI 1_0 and DCI 1_3, as in PTM-2, switching between DCI 1_0 and DCI 1_3 is necessary based on the field of the DCI.

(3.1.2) Operation Example 1-2

In this example, the MBS PDSCH may be scheduled using DCI 1_1 or DCI 1_2. Specifically, the MBS PDSCH may be scheduled using a DCI format other than DCI 1_0 (an existing DCI format may be used) in the PTM-1 that schedules the MBS PDSCH using a DCI that has been CRC scrambled by G-RNTI.

The DCI format used to schedule the MBS PDSCH may be a DCI payload equal to one of the existing DCI formats (DCI 1_1/DCI 1_2/DCI 2_x).

FIG. 9 shows an example of a correspondence relationship between RNTI and DCI format according to operation example 1-2. As shown in FIG. 9, MBS PDSCH may be scheduled using a DCI format (CRC scrambled by G-RNTI) other than DCI 1_0, for example, DCI 1_2. Note that such DCI 1_2(CRC scrambled by G-RNTI) may be referred to as DCI 1_3 (tentative name) to distinguish it from the existing DCI format.

The information (i) to (xi) described above may be used in the schedule of MBS PDSCH.

The UE200 may perform a CRC check that is CRC scrambled with G-RNTI only if the higher layer is configured/instructed to measure (detect) the DCI or the DCI format.

Note that the size of the DCI 1_1 or DCI 1_2 for each UE is variable (may be set by the RRC for each UE). On the other hand, the common DCI size of the UE that is CRC scrambled by the G-RNTI must be constant among UEs related to the common G-RNTI.

In order to apply this operation example, it is necessary to set the DCI format (In FIG. 9, DCI 1_2) of the same size as the DCI that is CRC scrambled by the G-RNTI among UEs related to the common G-RNTI. In the operation example 2 described below, such restriction can also be eliminated.

(3.2) Operation Example 2

In this operation example, MBS PDSCH may be scheduled using DCI 1_0. Specifically, MBS PDSCH may be scheduled using DCI 1_0 in PTM-1, which schedules MBS PDSCH using DCI that is CRC scrambled by G-RNTI.

DCI 1_0 that is CRC scrambled by G-RNTI may include at least one DCI field other than the DCI field (Hereinafter, in particular, the DCI field in the case of CRC scramble by C-RNTI may be meant) included in the existing DCI 1_0. That is, DCI 1_0 that is CRC scrambled by G-RNTI may not include at least one DCI field included in the existing DCI 1_0.

FIG. 10 shows an example of the correspondence relationship between RNTI and DCI format according to operation example 2. As shown in FIG. 10, the size of the DCI field included in the existing DCI 1_0 may be reduced, and the DCI field (For example, any of the information (i)-(xi) described above may be used) not included in the existing DCI 1_0 may be specified by using the bits of the DCI not used.

For example, 3 bits may be assigned to the PUCCH resource indicator (PRI), but 2 bits may be assigned to the instruction of the information (i) to (xi) described above, with the PRI set to 1 bit.

In DCI 10 that has been CRC scrambled by G-RNTI, unnecessary or reducible fields include the following.

Identifier for DCI formats −1 bit

TPC command for scheduled PUCCH −2 bit

PUCCH resource indicator −3 bit

PDSCH-to-HARQ_feedback timing indicator −3 bit

As for the Identifier for DCI formats, since there is no DCI format 0_0(UL grant) which is CRC scrambled by G-RNTI (MBS PUSCH is not specified), it is unnecessary to distinguish DCI 0_0 from DCI 1_0 by using the field concerned.

The above-mentioned unnecessary or reducible fields may be interpreted that at least one of the fields concerned does not exist (or the number of allocated bits is reduced) in DCI 1_0 which is CRC scrambled by G-RNTI.

The deleted or reduced bits/fields which are no longer used may be used to indicate a DCI field (For example, the information (i)-(xi) described above) which does not exist in the existing DCI 1_0(CRC scrambled by C-RNTI).

Alternatively, operation 1: The field name exists as described above, and may be used in some fields for purposes other than the description of the field name (For example, use "Identifier for DCI formats" to indicate the number of MIMO layers/DMRS port index(es)) and may be "Action 2: Field names exist as described above and are not used for any purpose in some fields" (For example, "Identifier for DCI formats" exists but is not used for any purpose (UEs are ignored)).

In addition, operation 1 and operation 2 may be switched by a higher layer, or may be applied only when UE200 reports that they are supported as UE capability information.

Alternatively, the following information may be interpreted as being transmitted by DCI 1_0(CRC scrambled by G-RNTI):

Frequency domain resource assignment

Time domain resource assignment −4 bits

Virtual Resource Block (VRB)-to-PRB mapping −1 bits

Modulation and coding scheme −5 bits

New data indicator −1 bits

Redundancy version −2 bits

HARQ process number −4 bits

Downlink assignment index −2 bits

TPC command for scheduled PUCCH −2 bit

PUCCH resource indicator −3 bit

PDSCH-to-HARQ_feedback timing indicator −3 bit

Antenna port(s) −1 bit

In this example, Antenna port(s) is indicated by 1 bit (see also operation example 3). In this operation example, attention is paid to Antenna port(s), but this example is not limited to Antenna port(s).

The number of bits of the newly added Antenna port(s) may be changed depending on the higher layer, so that it can be set. However, the size of DCI 1_0 may be unchanged (constant) depending on the higher layer (for example, the Antenna port(s) field may be changed and set in the range of 1~6 bits depending on the higher layer, but if the Antenna port(s) field exceeds 1 bit, the other fields of (For example, the TPC command for scheduled PUCCH and/or PUCCH resource indicator may be absent or ignored).

FIG. 11 shows an example of configuring the Antenna port(s) field according to the operation example 2. FIG. 11 shows an example in which the size of the Antenna port(s) field can be set to 1~6 bits depending on the higher layer. Note that the size of DCI 1_0 is unchanged and constant. In other words, the sum of the three fields is always 6 bits, regardless of the value of Antenna port(s) field(x).

The reduced bit fields may be used or ignored. Whether they are used or ignored may be toggled by higher layers. In FIG. 11, an example is imagined in which the TPC command is reduced first and then the PUCCH resource indicator is reduced, but the reverse may be true. The TPC command and the PUCCH resource indicator (PRI) are examples and not limited thereto.

When PRI is used, it is difficult to specify a flexible PUCCH resource because the PUCCH resource is indicated by the PRI field common to UEs among multiple UEs related to the same G-RNTI.

FIG. 12 shows an example of configuring the PUCCH resource indicator. As shown in FIG. 12, when a plurality of PUCCH resources are indicated in a common DCI field of a common DCI, the PUCCH resources can only be indicated in conjunction among the plurality of UEs (1 of 8 patterns in the frame is selected). Therefore, in this operation example, we propose an operation in which 3 bits of PRI are not used to indicate the PUCCH resources, and the number of bits of PRI is reduced or eliminated (0 bits).

In addition, when PRI is used, since the size of the PRI field is variable, the correspondence between each PUCCH resource and the PRI (variable field) may be specified. FIG. 13 shows an example of the correspondence between each PUCCH resource and the PRI (variable field).

As shown in FIG. 13, the corresponding number of PUCCH resources may vary depending on the PRI field being 0~3 bits. Note that even if PRI is set to 0 bits, different PUCCH resources can be set between UEs if different PUCCH resources are set for each UE by RRC. Also, if HARQ's NACK only feedback is used, it is possible to operate even if a common PUCCH resource is set for each UE.

In DCI 1_2 of 3GPP Release-16, the PRI is variable length and the total size of the DCI is variable length, but in this operation example, it is DCI 1_0 and the total size of the DCI is fixed. When the PRI becomes variable length, the bits of the DCI become free, and the DCI other than the PRI is instructed using the free bits.

The variable bit length (number of bits) of the field shown in FIG. 13 may also be applied to other fields.

FIG. 14 shows an example of configuring a variable size DCI field according to operation example 2. As shown in FIG. 14, the field size of the PDSCH-to-HARQ_feedback timing indicator may also be variable.

Further, the HARQ transmission to the MBS PDSCH may be executed only when it is set by a higher layer. If it is not set by a higher layer, the UE200 may not execute the HARQ transmission to the MBS PDSCH. In this case, the following fields may be removed or reduced:

Downlink assignment index −2 bits

TPC command for scheduled PUCCH −2 bits

PUCCH resource indicator −3 bits

PDSCH-to-HARQ_feedback timing indicator −3 bits

Without HARQ feedback, the Downlink Assignment Index (DAI) is also not required.

(3.3) Operation Example 3

In this example, DCI 1_0 may be used to transmit PDSCH over multiple ports (MIMO). Specifically, MBS PDSCH scheduled by DCI format containing the "Antenna port(s)" field may be transmitted over multiple ports (MIMO).

FIG. 15 shows an example of configuring the Antenna port(s) field according to operation example 3. "Antenna port(s)" in DCI format with CRC scrambled by G-RNTI can be set using any of 3GPP TS38.212 (Tables 7.3.1.2.2-1 to 7.3.1.2.2-4). DCI bits and number of MIMO layers/DMRS ports/Code Domain Sharing (CDM) group may be indicated.

The same DMRS port may use the same CDM group. Up to two DMRS ports per CDM group may be orthogonally multiplexed in the frequency domain OCC(Orthogonal Cover Code) (cyclic shift).

Which table is used may be set by the higher layer or may be predetermined as a 3GPP specification. Alternatively, the table may be newly defined for MBS as shown in FIG. 15.

The contents of the table shown in FIG. 15 are illustrative and not limited thereto. The DMRS port number corresponds to the antenna port and may mean switching antennas by switching between "0" and "1." The DMRS port number may also mean the number of MIMO layers. The number of rows and/or columns of the table may also be changed.

The Number of DMRS CDM group(s) without data may be a predetermined value (set by the 3GPP specification or a higher layer). Originally, Multi-User (MU)-MIMO indicates whether a PDSCH schedule to another UE is being performed, but MBS PDSCH is unlikely to apply MU-MIMO (using bits for MU-MIMO may be considered wasteful).

FIG. 16 shows an example of correspondence between the DCI format and the Antenna port(s) field in operation example 3. As shown in FIG. 16, the size of the Antenna port(s) field varies depending on the DCI format/RNTI, and the Antenna port table referred to may vary.

In the case of an Antenna port(s) field of a given number of bits (when an Antenna port(s) table of a given number of columns is configured), and especially when the lower table of FIG. 15 (a table that can be configured with DMRS of up to 2 ports) is configured, the UE200 may not report a portion of the CSI (For example, Precoding Matrix Index (PMI)).

Assuming a cross-port antenna (Antenna using horizontal and vertical radio waves), a 1-bit Antenna port(s) field that can indicate only 2 layers of MIMO on/off may not report the PMI (The gNB100 can properly indicate the 1 bit Antenna port(s) field if it is known whether MIMO has a sufficient SNR to perform).

In order to perform normal MIMO, the UE200 reports to the gNB100 as a PMI which of a plurality of MIMO precoders is appropriate. In a cross-pole antenna, channels in the horizontal and vertical directions are generally uncorrelated and therefore always available (no rank drop occurs). Therefore, when performing two-layer MIMO in a cross-pole antenna, the channel correlation between the antenna ports does not have to be considered, and therefore, two-layer MIMO can be used in PDSCH even without PMI.

In addition, when performing MIMO in multicast PDSCH, the appropriate MIMO precoder for each UE is different, and therefore, even if PMI is reported for each UE, the gNB100 cannot use PMI appropriately.

Note that this operation example may also be applied to unicast PDSCH rather than multicast. D2D (Device to Device), V2X (Vehicle to X), and IAB (Integrated Access and Backhaul) may also be applied.

This operation example may be interpreted as scheduling PDSCH of multiple ports (MIMO) using DCI 1_0.

Whether the antenna port(s) field is present or not may be determined in accordance with the control information of the higher layer and/or the RNTI at which the DCI 1_0 is CRC scrambled.

The DCI 1_0 may be limited (Alternatively, DCI 1_0 is limited to DCI 1_0 that is CRC scrambled by RNTI (For example, G-RNTI) assigned to multiple UEs) to the DCI 1_0 that schedules the multicast PDSCH.

The PDSCH may be a multicast PDSCH (such as a group-common PDSCH). Alternatively, it may be a PDSCH in which the data/DMRS sequence is scrambled by RNTI (For example, G-RNTI) assigned to multiple UEs.

(4) Operational Effects

According to the above-described embodiment, the following effects can be obtained. Specifically, according to the gNB100 and UE200 according to the operational example 1~3, flexible and efficient scheduling using DCI can be realized in MBS, that is, simultaneous data transmission service to a plurality of specified or unspecified UEs.

In particular, instructions such as Antenna port(s) can be given while using DCI 1_0 or DCI 1_3 (tentative name). The bit length (number of bits) of the DCI is suppressed. Therefore, a more flexible and efficient schedule such as MBS PDSCH can be executed.

(5) Other Embodiments

Although the embodiments have been described above, they are not limited to the description of the embodiments, and it is obvious to those skilled in the art that various modifications and improvements can be made.

For example, in the embodiments described above, the names PDCCH and PDSCH were used as the downlink channels, but the downlink control channels or downlink data channels (which may be shared channels) may be called by different names.

In the above-described embodiment, the MBS PDSCH has been described as an example, but at least any of the above-described operation examples may also be applied to other downlink channels such as the MBS PDCCH. Furthermore, the above-described operation examples may be combined and applied in combination as long as there is no conflict.

In the foregoing description, configure, activate, update, indicate, enable, specify, and select may be interchanged. Similarly, link, associate, correspond, and map may be interchanged, and allocate, assign, monitor, and map may be interchanged.

In addition, specific, dedicated, UE-specific, and UE-specific may be interchanged. Similarly, common, shared, group-common, UE-common, and UE-shared may be interchanged.

Further, the block configuration diagram (FIG. 4) used for the description of the above-described embodiment shows blocks of functional units. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (configuration part) that functions transmission is called a transmission unit (transmitting unit) or a transmitter. As described above, the method of realization of both is not particularly limited.

Figure 17:
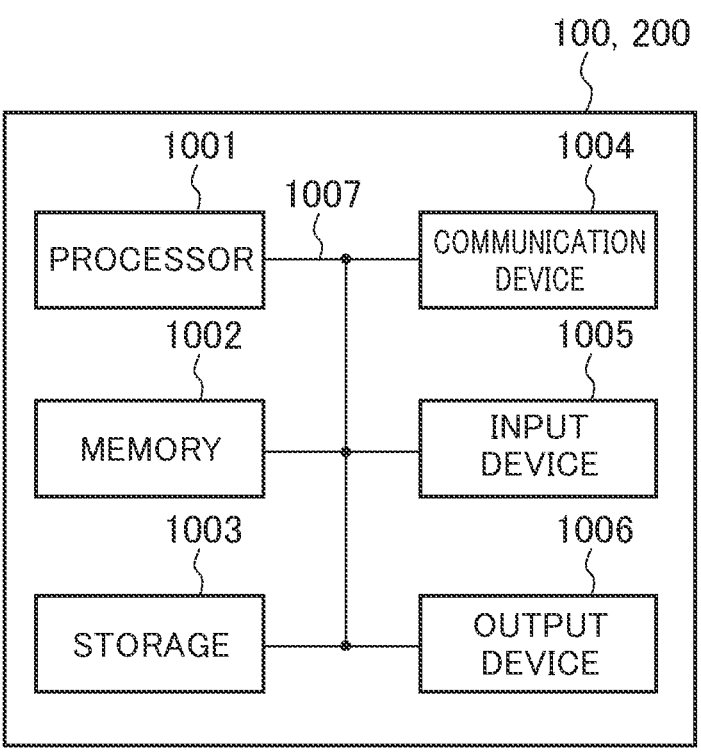
FIG. 17 is a diagram showing an example of a hardware configuration of the gNB100 and the UE200.

Furthermore, the gNB100 and UE200 described above may function as computers for processing the radio communication method of the present disclosure. FIG. 17 is a diagram showing an example of a hardware configuration of the device. As shown in FIG. 17, the device may be configured as a computer device including a processor 1001, a memory 1002, a storage 1003, a communication device 1004, an input device 1005, an output device 1006 and a bus 1007.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

Each functional block of the device (see FIG. 4) is implemented by any hardware element or combination of hardware elements of the computer device.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

Processor 1001, for example, operates an operating system to control the entire computer. Processor 1001 may be configured with a central processing unit (CPU), including interfaces to peripheral devices, controls, computing devices, registers, etc.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 may be referred to as a register, cache, main memory (main storage device), or the like. The memory 1002 may store a program (program code), a software module, or the like capable of executing a method according to an embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Each device, such as the processor 1001 and the memory 1002, is connected by a bus 1007 for communicating information. The bus 1007 may be configured using a single bus or a different bus for each device.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Further, the notification of information is not limited to the aspects/embodiments described in the present disclosure and may be carried out using other methods. For example, the notification of information may be performed by physical layer signaling (e.g., Downlink Control Information (DCI), Uplink Control Information (UCI), higher layer signaling (e.g., RRC signaling, Medium Access Control (MAC) signaling, Notification Information (Master Information Block (MIB), System Information Block (SIB)), other signals or combinations thereof. RRC signaling may also be referred to as RRC messages, e.g., RRC Connection Setup messages, RRC Connection Reconfiguration messages, etc.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing steps, sequences, flowcharts, etc., of each of the embodiments/embodiments described in the present disclosure may be reordered as long as there is no conflict. For example, the method described in the present disclosure presents elements of various steps using an exemplary sequence and is not limited to the particular sequence presented.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from a higher layer (or lower layer) to a lower layer (or higher layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each of the embodiments/embodiments described in the present disclosure may be used alone, in combination, or alternatively with execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of the channels and symbols may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)," "radio base station," "fixed station," "NodeB," "eNodeB (eNB)," "gNodeB (gNB)," "access point," "transmission point," "reception point," "transmission/reception point," "cell," "sector," "cell group," "carrier," "component carrier," and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)," "user terminal," "user equipment (User Equipment: UE)," "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The mobile may be a vehicle (For example, cars, planes, etc.), an unmanned mobile (For example, drones, self-driving cars), or a robot (manned or unmanned). At least one of a base station and a mobile station can be a device that does not necessarily move during the communication operation. For example, at least one of a base station and a mobile station may be an Internet of Things (IoT) device such as a sensor.

The base station in the present disclosure may be read as a mobile station (user terminal, hereinafter the same). For example, each aspect/embodiment of the present disclosure may be applied to a configuration in which communication between a base station and a mobile station is replaced by communication between a plurality of mobile stations (For example, it may be called device-to-device (D2D), vehicle-to-everything (V2X), etc.). In this case, the mobile station may have the function of the base station. Further, words such as "up" and "down" may be replaced with words corresponding to communication between terminals (For example, "side"). For example, up channels, down channels, etc. may be replaced with side channels (or side links).

Similarly, mobile stations in the present disclosure may be replaced with base stations. In this case, the base station may have the function of the mobile station. A radio frame may be composed of one or more frames in the time domain. Each frame or frames in the time domain may be referred to as a subframe. A subframe may be further configured by one or more slots in the time domain. Subframes may be of a fixed time length (For example, 1 ms) independent of numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. PDSCH (or PUSCH) transmitted in units of time greater than the minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one of the subframes and TTI may be a subframe in an existing LTE (1 ms), a period shorter than 1 ms (For example, 1~13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. The number of slots (number of minislots) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain. The number of subcarriers included in RB may be, for example, twelve, and the same regardless of the topology. The number of subcarriers included in the RB may be determined based on the neurology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by an index of the RB relative to the common reference point of the carrier. PRB may be defined in BWP and numbered within that BWP.

BWP may include UL BWP (UL BWP) and DL BWP (DL BWP). One or a plurality of BWPs may be configured in one carrier for the UE.

At least one of the configured BWPs may be active, and the UE may not expect to send and receive certain signals/channels outside the active BWP. Note that "cell," "carrier," and the like in this disclosure may be read as "BWP."

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected," "coupled," or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access." In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on."

The "means" in the configuration of each apparatus may be replaced with "unit," "circuit," "device," and the like.

Any reference to an element using a designation such as "first," "second," and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include," "including," and variants thereof are intended to be inclusive in a manner similar to the term "comprising." Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining," "judging" and "deciding" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. In other words, "judgment" and "decision" may include regarding some action as "judgment" and "decision." Moreover, "judgment (decision)" may be read as "assuming," "expecting," "considering," and the like.

In the present disclosure, the term "A and B are different" may mean "A and B are different from each other." It should be noted that the term may mean "A and B are each different from C." Terms such as "leave," "coupled," or the like may also be interpreted in the same manner as "different."

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 radio communication system
20 NG-RAN
100 gNB
200 UE
210 radio signal transmission and reception unit
220 amplifier unit
230 modulation and demodulation unit
240 control signal and reference signal processing unit
250 encoding/decoding unit
260 data transmission and reception unit
270 control unit
1001 processor
1002 memory
1003 storage
1004 communication device
1005 input device
1006 output device
1007 bus

The invention claimed is:

1. A terminal comprising:
a receiver that receives downlink control information scrambled by a group common radio network temporary identifier (RNTI) for broadcast and downlink control information scrambled by another group common RNTI for multicast; and
a processor that executes scheduling of a downlink data channel for broadcast in data distribution for multiple terminals based on the downlink control information for broadcast and executes scheduling of a downlink data channel for multicast in data distribution for multiple terminals based on the downlink control information for multicast,
wherein the downlink control information for broadcast does not include an Identifier for Downlink Control Information (DCI) formats and a transmit power control (TPC) command for scheduling Physical Uplink Control Channel (PUCCH), further does not include at least one of a field of a PUCCH resource indicator and a field of a Physical Downlink Shared Channel-to-Hybrid Automatic Repeat Request (PDSCH-to-HARQ) feedback timing indicator, among fields of downlink control information scrambled by a terminal-specific RNTI, and includes a field other than the fields of the downlink control information scrambled by the terminal-specific RNTI, and has a same size as that of the downlink control information scrambled by the terminal-specific RNTI, and wherein the downlink control information for multicast does not include each field of the Identifier for DCI formats and the TPC Command for scheduling PUCCH, but includes the PUCCH resource indicator and the PDSCH-to-HARQ feedback timing indicator among the fields which are included in the downlink control information scrambled by the terminal-specific RNTI, when the downlink control information for multicast includes an antenna port field, a size of the antenna port field is based on a higher layer, and when the downlink control information for multicast does not include the antenna port field, the downlink control information for multicast has a same size as that of the downlink control information scrambled by the terminal-specific RNTI.

2. The terminal according to claim 1, wherein the group common RNTI for broadcast is a group radio network temporary identifier (G-RNTI) and the terminal-specific RNTI is a cell radio network temporary identifier (C-RNTI).

3. A communication method of a terminal comprising:

receiving downlink control information scrambled by a group common radio network temporary identifier (RNTI) for broadcast and downlink control information scrambled by another group common RNTI for multicast; and executing scheduling of a downlink data channel for broadcast in data distribution for multiple terminals based on the downlink control information for broadcast and scheduling of a downlink data channel for multicast in data distribution for multiple terminals based on the downlink control information for multicast, wherein the downlink control information for broadcast does not include an Identifier for Downlink Control Information (DCI) formats and a transmit power control (TPC) command for scheduling Physical Uplink Control Channel (PUCCH), further does not include at least one of a field of a PUCCH resource indicator and a field of a Physical Downlink Shared Channel-to-Hybrid Automatic Repeat Request (PDSCH-to-HARQ) feedback timing indicator, among fields of downlink control information scrambled by a terminal-specific RNTI, and includes a field other than the fields of the downlink control information scrambled by the terminal-specific RNTI, and has a same size as that of the downlink control information scrambled by the terminal-specific RNTI, and wherein the downlink control information for multicast does not include each field of the Identifier for DCI formats and the TPC Command for scheduling PUCCH, but includes the PUCCH resource indicator and the PDSCH-to-HARQ feedback timing indicator among the fields which are included in the downlink control information scrambled by the terminal-specific RNTI, when the downlink control information for multicast includes an antenna port field, a size of the antenna port field is based on a higher layer, and when the downlink control information for multicast does not include the antenna port field, the downlink control information for multicast has a same size as that of the downlink control information scrambled by the terminal-specific RNTI.

4. A communication system including a base station and a terminal, wherein the base station comprises a transmitter that transmits downlink control information scrambled by a group common radio network temporary identifier (RNTI) for broadcast and downlink control information scrambled by another group common RNTI for multicast, and the terminal comprises:

a receiver that receives the downlink control information for broadcast and the downlink control information for multicast; and a processor that executes scheduling of a downlink data channel for broadcast in data distribution for multiple terminals based on the downlink control information for broadcast and executes scheduling of a downlink data channel for multicast in data distribution for multiple terminals based on the downlink control information for multicast, wherein a field of the downlink control information for broadcast does not include an Identifier for Downlink Control Information (DCI) formats and a transmit power control (TPC) command for scheduling Physical Uplink Control Channel (PUCCH), further does not include at least one of a field of a PUCCH resource indicator and a field of a Physical Downlink Shared Channel-to-Hybrid Automatic Repeat Request (PDSCH-to-HARQ) feedback timing indicator, among a plurality of fields of downlink control information scrambled by a terminal-specific RNTI, and includes a field other than the fields of the downlink control information scrambled by the terminal-specific RNTI, and has a same size as that of the downlink control information scrambled by the terminal-specific RNTI, and wherein a field of the downlink control information for multicast does not include each field of the Identifier for DCI formats and the TPC Command for scheduling PUCCH, but includes the PUCCH resource indicator and the PDSCH-to-HARQ feedback timing indicator among the fields which are included in the downlink control information scrambled by the terminal-specific RNTI, when the downlink control information for multicast includes an antenna port field, a size of the antenna port field is based on a higher layer, and when the downlink control information for multicast does not include the antenna port field, the downlink control information for multicast has a same size as that of the downlink control information scrambled by the terminal-specific RNTI.

* * * * *